United States Patent Office 3,184,465
Patented May 18, 1965

3,184,465
ALKENYL THIONOPHOSPHONIC ACID FLUORAMIDES
Gerhard Schrader, Wuppertal-Cronenberg, Germany, assignor to Farbenfabriken Bayer Aktiengesellschaft, Leverkusen, Germany, a German corporation
No Drawing. Filed Mar. 1, 1960, Ser. No. 11,951
Claims priority, application Germany, Mar. 3, 1959, F 27,844
6 Claims. (Cl. 260—293.4)

The present invention relates to and has as its objects new and useful thiophosphonic acid ester fluorides with insecticidal or generally pesticidal properties and processes for their production. Generally the new compounds of the present invention may be represented by the following formula

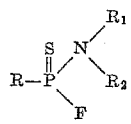

wherein R and $R_1$ stand for aliphatic radicals, and $R_2$ stands for an alkyl radical or hydrogen; $R_1$ and $R_2$ may also include a ring system.

Phosphonic acid ester fluorides similar to the compounds of this invention are already known from the literature. But regarding their highly toxic activity against mammals especially human beings they did not become of importance in the agricultural field.

The preparation of the inventive compounds proceeds according to methods known in principle. Since thionophosphonic acid difluorides became accessible there was opened an economic way for obtaining the inventive compounds.

In accordance with this invention it has been found that aliphatic thionophosphonic acid difluorides of the general formula

wherein R stands for an aliphatic radical, may be reacted with primary and secondary amines in such a manner that only one fluorine atom is exchanged for the radical of the base used. In this way, the inventive thionophosphonic acid fluoramides of the above formula are obtained.

The reaction of aliphatic thionophosphonic acid difluorides with primary or secondary bases is advantageously carried out at room temperature or at temperatures of about 20–40° C. The reaction is advantageously carried out in the presence of an inert solvent. Useful solvents of this type are ether, benzene or toluene. The hydrofluoric acid formed in the aforesaid reaction is best removed by the addition of an aliphatic base. The process is most advantageously carried out by using an excess of the base to be employed which itself acts as an acid-binding agent.

The new alkyl-thionophosphonic acid amide fluorides are water-insoluble, colorless, nearly odourless oils which may be distilled in a vacuum. The compounds are distinguished by a comparatively slight toxicity towards warm-blooded animals and a very high insecticidal activity.

As examples for the special utility the compounds of the following formulae (I) 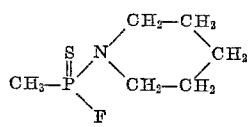

(II) 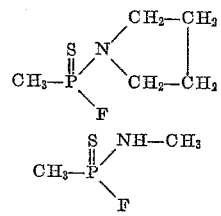

(III) 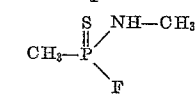

have been tested against flies and spider mites respectively. Aqueous dilutions of these compounds have been prepared by mixing the active ingredient with the same amount of dimethyl formamide as an auxiliary solvent adding thereto 20% by weight referred to active ingredient of a commercial emulsifier consisting of a benzyl hydroxy polyglycol ether containing about 10 to 15 glycol ethers, and diluting this premixture at last with water to the desired concentration indicated in the following paragraphs:

The tests have been carried out as follows.

Against flies: about 50 flies (*Musca domestica*) are placed under covered petri dishes in which drip wet filter paper has been placed which is sprayed with an insecticidal solution of a concentration as shown below. The living status of the flies has been determined after 24 hours. The following results have been obtained:

| Compound aqueous concentration (in percent active ingredient/water) | Killing rate (in percent) |
|---|---|
| (I) 0.001 | 100 |
| (III) 0.01 | 100 |

Against spider mites: bean plants (*Phaseolus vulgaris*) of about 15 inches height are sprayed drip wet with solutions as prepared above in a concentration as shown below. The bean plants have been infested heavily with the two-spotted spider (species *Tetranychus telarius*). Evaluation has been carried out after 24 hours, 48 hours and 8 days. The following results have been obtained:

| Compound aqueous concentration (in percent active ingredient/water) | Killing rate (in percent) |
|---|---|
| (II) 0.01 | 100 |

The following examples are given for the purpose of illustrating the process claimed herein.

Example 1

58 grams (0.5 mol) of methyl-thionophosphonic acid difluoride (B.P. 84° C./760 mm. Hg) are dissolved in 400 cc. of benzene. 90 grams of a 50% benzenic dimethylamine solution are added dropwise at 20° C. with stirring and external cooling. The mixture is stirred for a further 3 hours, then cooled to +5° C. and 50 cc. of ice water are added to the reaction product. The aqueous phase is separated, the benzene solution dried with sodium sulfate and fractionated. 59 grams of methyl-fluorothionophosphonic acid dimethyl amide of B.P. 50° C./2 mm. Hg are thus obtained. Yield 85% of the theoretical. The new fluoride is a colorless water-insoluble oil. Toxicity on rats per os 5 mg./kg. $LD_{95}$. Flies are killed to 100% with 0.01% solutions.

By the same way but using instead of methyl-thionophosphonic acid difluoride the corresponding equimolecular amount of butyl-thionophosphonic acid difluoride there may be obtained the following compound:

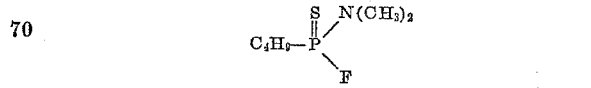

If cyclohexyl-thionophosphonic acid difluoride is used in equimolecular amounts, there is obtained the following compound:

$$\text{cyclo-}C_6H_{11}-\overset{\overset{S}{\|}}{P}\overset{N(CH_3)_2}{\diagdown_F}$$

*Example 2*

$$CH_3-\overset{\overset{S}{\|}}{P}\overset{N(C_2H_5)_2}{\diagdown_F}$$

58 grams (0.5 mol) of methyl-thionophosphonic acid difluoride are dissolved in 400 cc. of benzene. 73 grams of diethyl amine are added dropwise at 20° C. with stirring. The mixture is stirred for a further 3 hours and then worked up as described in Example 1. 35 grams of methyl-fluoro-thionophosphonic acid diethyl amide of B.P. 72° C./2 mm. Hg are obtained. Yield 41% of the theoretical. The new fluoride is a colorless water-insoluble oil. Systemic action on aphids with 0.1% solutions is 100%. Toxicity on rats per os 50 mg./kg. $LD_{50}$.

*Example 3*

$$CH_3-\overset{\overset{S}{\|}}{P}\overset{\diagup N\diagdown}{\diagdown_F}\overset{CH_2-CH_2}{\underset{CH_2-CH_2}{\diagdown}}CH_2$$

58 grams (0.5 mol) of methyl-thionophosphonic acid difluoride are dissolved in 400 cc. of benzene. 85 grams of anhydrous piperidine are added dropwise at 25° C. with stirring. The piperidine is previously dissolved in 50 cc. of benzene. The mixture is stirred for a further 5 hours and then worked up as described in Example 1. 56 grams of methyl-fluoro-thionophosphonic acid piperidide of B.P. 78° C./1 mm. Hg are obtained. Yield 62% of the theoretical. The new fluoride is a colorless, water-insoluble oil. Flies are killed completely with 0.001% solutions. Toxicity on rats per os 5 mg./kg. $LD_{50}$.

*Example 4*

$$CH_3-\overset{\overset{S}{\|}}{P}\overset{\diagup N\diagdown}{\diagdown_F}\overset{CH_2-CH_2}{\underset{CH_2-CH_2}{\diagdown}}O$$

58 grams (0.5 mol) of methyl-thionophosphonic acid difluoride are dissolved in 400 cc. of benzene. 87 grams of anhydrous morpholine are added dropwise at 25° C. with stirring. The mixture is stirred for a further 5 hours and then worked up as described in Example 1. 51 grams of methyl-fluoro-thionophosphonic acid morpholide of B.P. 88° C./1 mm. Hg are thus obtained. Yield 56% of the theoretcial. The new fluoride is a slightly yellow-colored, water-insoluble oil. Spider mites are killed completely with 0.01% solutions. Toxicity on rats per os 25 mg./kg. $LD_{50}$.

*Example 5*

$$CH_3-\overset{\overset{S}{\|}}{P}\overset{\diagup N\diagdown}{\diagdown_F}\overset{CH_2-CH_2}{\underset{CH_2-CH_2}{|}}$$

58 grams (0.5 mol) of methyl-thionophosphonic acid difluoride are dissolved in 400 cc. of benzene; 71 grams of anhydrous pyrrolidine dissolved in 50 cc. of benzene are added at 20° C. with stirring. The mixture is then stirred at 20–25° C. for a further 3 hours and then cooled to +5° C. The reaction product is treated with 50 cc. of ice-water. The aqueous layer is separated, the benzene solution dried and subsequently fractionated. 52 grams of methyl-thiono-fluoro-phosphonic acid pyrrolidide of B.P. 74° C./1 mm. Hg are thus obtained. Yield 62% of the theoretical. Spider mites are killed completely with 0.01% solutions. Toxicity on rats per os 5 mg./kg. $LD_{95}$.

*Example 6*

$$CH_3-\overset{\overset{S}{\|}}{P}\overset{NH-CH_3}{\diagdown_F}$$

58 grams (0.5 mol) of methyl-thionophosphonic acid difluoride are dissolved in 400 cc. of benzene. 31 grams of monomethyl amine, dissolved in 60 cc. of benzene, are added dropwise at 20° C. with stirring. The mixture is stirred at 20° C. for a further 3 hours, then cooled to +5° C. and worked up in a usual manner. 47 grams of methyl-thionophosphonic acid methyl amide of B.P. 58° C./1 mm. Hg are thus obtained. Yield 74% of the theoretical. Flies are killed completely with 0.01% solutions. Toxicity on rats per os 25 mg./kg. $LD_{50}$.

If instead of monomethyl-amine the corresponding equimolecular amount of monobutyl-amine is used there is obtained the following compound:

$$CH_3-\overset{\overset{S}{\|}}{P}\overset{NH-C_4H_9}{\diagdown_F}$$

If cyclohexyl-amine is used instead of monomethyl-amine there is obtained the following compound:

$$CH_3-\overset{\overset{S}{\|}}{P}\overset{NH-C_6H_{11}(cyclo)}{\diagdown_F}$$

*Example 7*

$$CH_3-\overset{\overset{S}{\|}}{P}\overset{\diagup N\diagdown}{\diagdown_F}\overset{CH_2}{\underset{CH_2}{|}}$$

58 grams (0.5 mol) of methyl-thionophosphonic acid difluoride are dissolved in 400 cc. of benzene. A mixture consisting of 22 grams of ethylene-imine, 51 grams of triethyl-amine and 50 cc. of benzene is then added dropwise at 20° C. with stirring. The mixture is stirred for a further 3 hours at 20° C. and then cooled to +5° C. The reaction product is treated with 50 cc. of ice-water. The benzene solution is separated, washed with water and dried. Upon fractionation, 19 grams of methyl-thiono-fluoro-phosphonic acid ethylene-imide of B.P. 46° C./3 mm. Hg are obtained. Yield 27% of the theoretical. The new fluoride is a colorless sparingly water-soluble oil. Aphids are killed completely with 0.1% solutions. Toxicity on rats per os 50 mg./kg. $LD_{50}$.

*Example 8*

$$CH_2=CH-\overset{\overset{S}{\|}}{P}\overset{N(CH_3)_2}{\diagdown_F}$$

64 grams (0.5 mol) of vinyl-thionophosphonic acid difluoride (B.P. 94° C./760 mm. Hg) are dissolved in 400 cc. of benzene. 90 grams of dimethyl amine, dissolved in 150 cc. of benzene are added dropwise at 20° C. with stirring. The mixture is stirred at 20–25° C. for a further 3 hours and worked up in a usual manner. 40 grams of vinyl-thiono-fluoro-phosphonic acid dimethyl amide of B.P. 64° C./1 mm. Hg are obtained. Yield 52% of the theoretical. Flies are killed completely with 0.01% solutions. Toxicity on rats per os 10 mg./kg. $LD_{50}$.

*Example 9*

$$C_2H_5-\overset{\overset{S}{\|}}{P}\overset{\diagup N\diagdown}{\diagdown_F}\overset{CH_2}{\underset{CH_2}{|}}$$

65 grams (0.5 mol) of ethyl-thionophosphonic acid difluoride (B.P. 98° C./760 mm. Hg) are dissolved in 400 cc. of benzene. A mixture of 20 grams of ethylene-imine, 51 grams of triethyl amine and 50 cc. of benzene is added at 20° C. with stirring. The mixture is stirred for a further 3 hours and then worked up in the usual manner; 28 grams of ethyl-thiono-fluoro-phosphonic acid ethyleneimide of B.P. 50° C./3 mm. Hg are thus obtained. Yield 37% of the theoretical. The new fluoride is a colorless sparingly water-soluble oil. Caterpillars are killed completely with 0.1% solutions. Toxicity on rats per os 50 mg./kg. $LD_{50}$.

*Example 10*

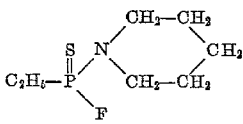

65 grams (0.5 mol) of ethyl-thionophosphonic acid difluoride are dissolved in 400 cc. of benzene. 85 grams of piperidine, dissolved in 50 cc. of benzene, are added at 20° C. with stirring. The mixture is stirred at 20–25° C. for 5 hours, then cooled at +5° C. and 50 cc. of ice-water are added. After separating and drying the benzene layer, the product is fractionated. 78 grams of ethyl-thiono-fluoro-phosphonic acid piperidide of B.P. 85° C./1 mm. Hg are thus obtained. Yield 80% of the theoretical. Caterpillars are killed completely with 0.1% solutions. Toxicity on rats per os 5 mg./kg. $LD_{95}$.

*Example 11*

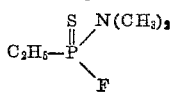

65 grams (0.5 mol) of ethyl-thionophosphonic acid difluoride are dissolved in 400 cc. of benzene. 90 grams of dimethyl amine, dissolved in 150 cc. of benzene, are added at 20° C. with stirring. The mixture is stirred at 20° C. for a further 3 hours and then worked up in a conventional manner. 65 grams of ethyl-thiono-fluoro-phosphonic acid dimethyl amide of B.P. 53° C./2 mm. Hg are obtained. Yield 84% of the theoretical. Flies are killed completely with 0.01% solutions. Toxicity on rats per os 2.5 mg./kg. $LD_{50}$.

*Example 12*

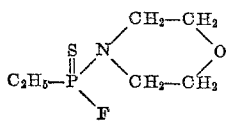

65 grams (0.5 mol) of ethyl-thionophosphonic acid difluoride are dissolved in 400 cc. of benzene. A solution of 87 grams of morpholine in 50 cc. of benzene are added at 20° C. with stirring. The mixture is stirred for a further 5 hours, then cooled to +5° C. and worked up in conventional manner. 62 grams of ethyl-thiono-fluoro-phosphonic acid morpholide of B.P. 92° C./1 mm. Hg are obtained. Yield 63% of the theoretical. Flies are killed completely with 0.001% solutions. Toxicity on rats per os 10 mg./kg. $LD_{95}$.

*Example 13*

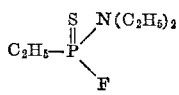

65 grams (0.5 mol) of ethyl-thionophosphonic acid difluoride are dissolved in 400 cc. of benzene. 73 grams of diethyl amine, dissolved in 50 cc. of benzene, are added at 20° C. with stirring. The mixture is stirred at 20–25° C. for a further 4 hours and then worked up in a conventional manner. 19 grams of ethyl-thiono-fluoro-phosphonic acid diethyl amide of B.P. 75° C./2 mm. Hg are obtained. Yield 21% of the theoretical. Spider mites are killed completely with 0.1% solutions. Toxicity on rats per os 25 mg./kg. $LD_{95}$.

*Example 14*

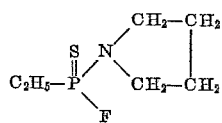

65 grams (0.5 mol) of ethyl-thionophosphonic acid difluoride are dissolved in 400 cc. of benzene. A solution of 71 grams of pyrrolidine in 50 cc. of benzene is then added at 20° C. with stirring. The mixture is stirred for a further 3 hours and then worked up in a usual manner. 64 grams of ethyl-thiono-fluoro-phosphonic acid pyrrolidide of B.P. 78° C./1 mm. Hg are obtained. Yield 71% of the theoretical. Spider mites are killed completely with 0.01% solutions. Toxicity on rats per os 5 mg./kg. $LD_{50}$.

*Example 15*

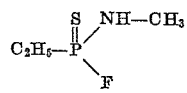

65 grams (0.5 mol) of ethyl-thionophosphonic acid difluoride are dissolved in 400 cc. of benzene. 31 grams of monomethyl amine, dissolved in 60 cc. of benzene, are added at 20° C. with stirring. The mixture is stirred for a further 3 hours, 50 cc. of water are added and worked up in a usual manner. 47 grams of ethyl-thiono-fluoro-phosphonic acid monomethyl-amide of B.P. 60° C./1 mm. Hg are thus obtained. Yield 67% of the theoretical. The new fluoride is a colorless water-insoluble oil. Caterpillars are killed completely with 0.1% solutions. Toxicity on rats per os 5 mg./kg. $LD_{50}$.

*Example 16*

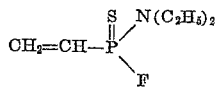

64 grams (0.5 mol) of vinyl-thionophosphonic acid difluoride (B.P. 94° C./760 mm. Hg) are dissolved in 400 cc. of benzene. 73 grams of diethyl amine are added at 20° C. with stirring. The mixture is stirred for a further 3 hours, then cooled at +5° C. and 50 cc. of water are added. It is thoroughly shaken and the benzene layer is separated. After drying, the product is fractionated. 11 grams of vinyl-thiono-fluoro-phosphonic acid diethyl amide of B.P. 74° C./1 mm. Hg are thus obtained. Yield 12% of the theoretical. Toxicity on rats per os 100 mg./kg. $LD_{50}$.

*Example 17*

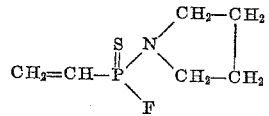

64 grams (0.5 mol) of vinyl-thionophosphonic acid difluoride are dissolved in 400 cc. of benzene. 71 grams of pyrrolidine, dissolved in 50 cc. of benzene, are added at 20° C. with stirring. The mixture is stirred for a further 4 hours and then worked up as described in the preceding example. 38 grams of vinyl-thiono-fluoro-phosphonic acid pyrrolidide of B.P. 84° C./1 mm. Hg are thus obtained (Y. 43%). Toxicity on rats per os 10 mg./kg. $LD_{50}$. Spider mites are killed completely with 0.01% solutions.

*Example 18*

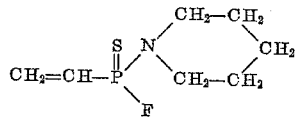

64 grams (0.5 mol) of vinyl-thionophosphonic acid difluoride are dissolved in 400 cc. of benzene. A solution of 85 grams of piperidine in 50 cc. of benzene are added at 20° C. The mixture is stirred at room temperature for a further 4 hours and then worked up in a usual manner. 32 grams of vinyl-thiono-fluoro-phosphonic acid piperidide of B.P. 88° C./1 mm. Hg are obtained. Yield 33% of the theoretical. Toxicity on rats per os 50 mg./kg. $LD_{50}$. Flies are killed completely with 0.01% solutions.

*Example 19*

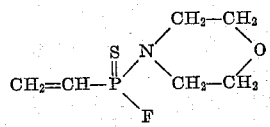

64 grams (0.5 mol) of vinyl-thionophosphonic acid difluoride are dissolved in 400 cc. of benzene. 87 grams of morpholine, dissolved in 50 cc. of benzene, are added at 20° C. with stirring. The mixture is stirred for a further 4 hours and then worked up in a usual manner; 12 grams of vinyl-thiono-fluoro-phosphonic acid morpholide of B.P. 98° C./1 mm. Hg are obtained. Yield 12% of the theoretical. Toxicity on rats per os 100 mg./kg. $LD_{50}$.

*Example 20*

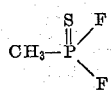

A mixture of 50 grams of antimonous trifluoride and 50 grams of sodium fluoride is finely divided and given in a distillation apparatus. There are introduced rapidly 149 grams of methyl-thionophosphonic acid dichloride. The reaction is strongly exothermic and part of the difluoride formed distills off immediately. Using a slight vacuum while cooling the recipient the remaining part of the difluoride distills off from the reaction container. The crude material is distilled, and at 84° C. the pure material distills over. 75 grams of the new product, i.e. 65% of the theoretical are obtained.

By another method the same difluoride may be obtained by the following way: 180 grams of sodium fluoride (finely divided) are mixed with 250 ml. of chloro-benzene in a distillation flask. After addition of 0.8 ml. of water there are added dropwise while external heating at 160° C. 149 grams of methyl-thionophosphonic acid dichloride dissolved in the same amount of chloro-benzene. The methyl-thionophosphonic acid difluoride distills off with the chloro-benzene and can be separated by fractionated distillation on a Vigreux column. 70 grams i.e. 60% of the theoretical are obtained.

The other alkyl-phosphonic acid difluorides used in the foregoing examples may be obtained in exactly the same manner as described in one of the procedures of the foregoing examples.

I claim:
1. A thionophosphonic acid ester fluoramide of the following formula

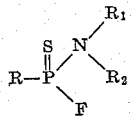

wherein R stands for alkenyl having up to 6 carbon atoms; $R_1$ stands for a member selected from the group consisting of alkyl having up to 6 carbon atoms and cyclohexyl; $R_2$ stands for a member selected from the group consisting of hydrogen and alkyl having up to 6 carbon atoms.

2. A thionophosphonic acid ester fluoramide of the following formula

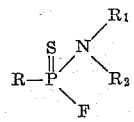

wherein R stands for alkenyl having up to 6 carbon atoms; and $R_1$ with $R_2$ stands for a member selected from the group consisting of alkylene having 2 to 5 carbon atoms and $CH_2CH_2OCH_2CH_2$.

3. The compound of the following formula

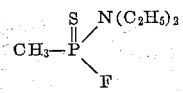

4. The compound of the following formula

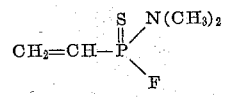

5. The compound of the following formula

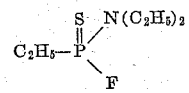

6. The compound of the following formula

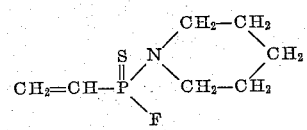

References Cited by the Examiner

FOREIGN PATENTS 729,586  5/55  Great Britain.
1,174,704  11/58  France.

OTHER REFERENCES

Chemical Abstracts, vol. 52, page 11733 (1958), abstracting, Razumov et al.

Chemical Abstracts, vol. 48, pp. 9901–9902 (1954), abstracting, Malatista, Farmaco, Ed. Sci. (Pavia), vol. 8, pp. 470–9 (1953).

IRVING MARCUS, *Primary Examiner.*

D. T. McCUTCHEN, WALTER A. MODANCE,
*Examiners.*